(12) United States Patent
Jadrić

(10) Patent No.: US 6,459,606 B1
(45) Date of Patent: Oct. 1, 2002

(54) CONTROL SYSTEM AND METHOD FOR FOUR-QUADRANT SWITCHES IN THREE-PHASE PWM AC VOLTAGE REGULATORS

(75) Inventor: Ivan Jadrić, York, PA (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 09/963,695

(22) Filed: Sep. 27, 2001

(51) Int. Cl.[7] ............................................. H02M 5/275
(52) U.S. Cl. ...................................................... 363/163
(58) Field of Search ................................. 363/157, 159, 363/163, 164, 165

(56) References Cited

U.S. PATENT DOCUMENTS

| | | |
|---|---|---|
| 3,670,234 A | 6/1972 | Joyce |
| 4,030,015 A | 6/1977 | Herko et al. |
| 4,580,089 A | 4/1986 | Grunsch et al. |
| 4,733,146 A * | 3/1988 | Hamby .................... 318/393 |
| 5,502,630 A | 3/1996 | Rokhvarg |
| 5,519,311 A | 5/1996 | Widmayer |
| 5,691,628 A | 11/1997 | Martin |
| 5,886,891 A | 3/1999 | Jiang et al. |
| 5,889,667 A | 3/1999 | Bernet |
| 5,909,367 A * | 6/1999 | Change ..................... 363/163 |
| 5,923,143 A | 7/1999 | Cosan et al. |
| 5,982,161 A | 11/1999 | Nguyen et al. |
| 6,020,726 A | 2/2000 | James |
| 6,025,701 A | 2/2000 | Weinhold |
| 6,301,130 B1 * | 10/2001 | Aiello et al. ................ 363/37 |

OTHER PUBLICATIONS

S. A. K. Bhat; "Digitally Controlled Multiple–Pulse–Width-Modulated AC Chopper for Power Control"; Int. J. Electronics, vol. 51, No. 1; 1981; pp. 45–56.

D. Borojevic; "Space Vector Modulation in Matrix Converters"; VPEC Publication Series, vol. V; 1994; pp. 287–297.

D.G. Holmes; "The Significance of Zero Space Vector for Carrier Based PWM Schemes"; Proceedings IEEE IAS 1995 Annual Meeting; 1995; pp. 2451–2458.

A. Mozdzer, B.K. Bose; "Three Phase AC Power Control Using Power Transistors", IEEE Transactions on Industry Transactions, vol. 1A–12, No. 5; Sep./Oct. 1976; pp. 499–505.

N. Burany; "Safe Control of Four Quadrant Switches"; Proceeding IEEE IAS 1989 Annual Meeting; 1989; pp. 1190–1194.

* cited by examiner

Primary Examiner—Matthew Nguyen
(74) Attorney, Agent, or Firm—McNees Wallace & Nurick LLC; Brian T. Sattizahn; Carmen Santa Maria (57) ABSTRACT

A method is provided for implementing a three-phase pulse-width-modulated alternating current voltage regulator including six four-quadrant switches, wherein each four-quadrant switch includes two two-quadrant switches. Three series branches, each series branch including one four-quadrant switch, and three shunt branches, each shunt branch including one four-quadrant switch, are provided. To obtain a desired converter state, the two-quadrant switches in the series and shunt branches are turned on or off in a predetermined sequence.

11 Claims, 6 Drawing Sheets

| Current polarity | | | Turned Off | Step 1 Turn off: | Step 2 Turn on: | Step 3 Turn off: | Step 4 Turn on: |
|---|---|---|---|---|---|---|---|
| $i_a$ | $i_b$ | $i_c$ | | | | | |
| + | - | - | s7, s8 | s2, s5, s9 | s3, s12 | s1, s6, s10 | s4, s11 |
| - | + | + | s7, s8 | s1, s6, s10 | s4, s11 | s2, s5, s9 | s3, s12 |
| - | + | - | s11, s12 | s1, s6, s9 | s4, s7 | s2, s5, s10 | s3, s8 |
| + | - | + | s11, s12 | s2, s5, s10 | s3, s8 | s1, s6, s9 | s4, s7 |
| - | - | + | s3, s4 | s1, s5, s10 | s8, s11 | s1, s6, s9 | s7, s12 |
| + | + | - | s3, s4 | s2, s6, s9 | s7, s12 | s1, s5, s10 | s8, s11 |

| Current polarity | | | Turned Off | Step 1 Turn off: | Step 2 Turn on: | Step 3 Turn off: | Step 4 Turn on: |
|---|---|---|---|---|---|---|---|
| $i_a$ | $i_b$ | $i_c$ | | | | | |
| + | - | - | s7, s8 | s4, s11 | s1, s6, s10 | s3, s12 | s2, s5, s9 |
| - | + | + | s7, s8 | s3, s12 | s2, s5, s9 | s4, s11 | s1, s6, s10 |
| - | + | - | s11, s12 | s3, s8 | s2, s5, s10 | s4, s7 | s1, s6, s9 |
| + | - | + | s11, s12 | s4, s7 | s1, s6, s9 | s3, s8 | s2, s5, s10 |
| - | - | + | s3, s4 | s7, s12 | s2, s6, s9 | s8, s11 | s1, s5, s10 |
| + | + | - | s3, s4 | s8, s11 | s1, s5, s10 | s7, s12 | s2, s6, s9 |

Fig. 4B

CONTROL SYSTEM AND METHOD FOR FOUR-QUADRANT SWITCHES IN THREE-PHASE PWM AC VOLTAGE REGULATORS

BACKGROUND OF THE INVENTION

This invention generally relates to control systems and methods for three-phase pulse-width-modulated (PWM) alternating-current (AC) voltage regulators (also referred to as AC choppers). More particularly, the present invention relates to a system and method for implementing a set of four-quadrant switches in a pulse-width-modulated alternating-current voltage regulator based on commutation of the load currents among different converter switches.

A number of applications, such as air-conditioning or refrigeration applications, utilize multi-phase induction motors. The starting, or inrush, current for multi-phase motors tends to be several times the rated full-load current. This high inrush current may have many detrimental effects on the equipment and the power system in general, as well as the economics of power usage. By means of example only, drawing high inrush current over a long power line may cause the voltage to essentially collapse, leaving insufficient voltage for equipment to operate. Furthermore, with high motor inrush current, other customers along the same power line may experience undesirable voltage fluctuations during the start of the motor. To discourage this situation, power companies sometimes impose penalties if a customer's starting or inrush currents are excessive. This is particularly true in regions with "weak" power grids, such as Europe. Thus, it is desirable to minimize the current drawn by a multi-phase induction motor during starting.

Several known methods exist which allow for the reduction of induction motors' inrush current. Use of an autotransformer is one known method for achieving lower motor starting currents. Autotransformers, however, are relatively inflexible in that the turns ratio of an autotransformer is established up front and remains fixed by the design of the components. Another approach employs the use of series elements such as inductors, resistors, and the like, to limit starting current. The latter approach, however, requires significantly higher line currents than autotransformer starters to provide the same amount of torque. Yet another approach consists in employing the so-called wye-delta motor starters. This type of equipment configures the connection of induction motor windings in a different manner during the motor start-up than during the regular motor operation. This allows the motor to start with a reduced inrush current.

The above methods for achieving reduced motor inrush currents can all be characterized as electro-mechanical methods. They require a set of electro-mechanical contactors in order to alter the connection of an induction motor to the power line. This altering of connection further results in a reduced voltage being applied to each of the motor's windings, which in turn results in reduced inrush currents. Electro-mechanical contactors have the disadvantage of being expensive and prone to reliability problems due to wear and tear. In addition, their transitions can cause voltage or current spikes with potentially damaging effects to the system.

The problems associated with electro-mechanical starting methods for induction motors can be avoided by employing electronic (or solid-state) starting methods. Electronic motor starters reduce the voltage supplied to an induction motor during its startup by means of a power electronics converter. One such converter technology employs thyristors, also called silicon-controlled rectifiers (SCRs). SCRs are semiconductor switches that can be turned on by means of an electronic signal. However, they cannot be forcefully turned off, i.e. they can be turned off only if the current through them naturally extinguishes itself. In a typical SCR-based motor starter, two SCRs are back-to-back connected between each of the motor's phases and the power line. During the motor start-up, the SCRs are turned on only once in every line cycle, and this is done in a delayed fashion, so that the motor is actually connected to the power line for only a portion of each line period. This results in a reduced voltage being applied to the motor, and therefore a reduced inrush current being drawn from the power line. The amplitude of the fundamental voltage being supplied to the motor is controlled by the time instant when an SCR is turned on within a line cycle. This type of control is usually referred to as phase control.

With no electro-mechanical contactors needed, SCR-based solid-state motor starters represent an improvement over electro-mechanical starters in terms of reliability and cost. However, SCR-based electronic starters have the disadvantage of distorting motor's current and voltage waveforms during the start-up. In addition, they offer no possibility for improving the power factor (power factor is intended as the phase displacement between the fundamental component of voltage and current at the line terminals feeding the motor starter). A good power factor is generally a desired feature in any electrical system.

Alternatively, PWM AC voltage regulators can be used for starting large induction motors, as they allow for a significant reduction in inrush current and provide better quality motor current and voltage waveforms during start-up than SCR-based motor starters. Similar to SCR-based technology, a PWM AC voltage regulator includes power electronics converter capable of supplying an output voltage of a fixed frequency, but at a variable magnitude, to AC loads. PWM AC voltage regulators differ from phase-controlled SCR-based AC voltage regulators, in that, with PWM AC voltage regulators, the switching of power semiconductors occurs at a frequency (called the switching frequency) many times higher than the input line frequency (usually equal to 50 or 60 Hz). Such high rate of semiconductor switching can be achieved with modern power semiconductors with full turn-on and turn-off capability, such as, for example, insulated gate bipolar transistors (IGBTs). The control of the fundamental amplitude of the output voltage of a PWM AC voltage regulator is achieved through the control of the width of the pulses of which the output waveform in such a regulator consists. A single-phase PWM AC voltage regulator circuit is described in U.S. Pat. No. 5,923,143 to Cosan et al. entitled "Solid State Motor Starter with Energy Recovery."

PWM AC voltage regulators, when used for starting of induction motors, have several advantages compared to SCR-based motor starters. First, they are able to start a motor with a smaller fundamental component of line inrush current. Typically, if an SCR-based motor starter requires an inrush current equal to 45% of motor's locked-rotor current (LRA), a PWM AC voltage regulator used with the same motor shall require around 20% of LRA. Second, PWM AC voltage regulators generate better-quality motor current and voltage waveforms during the start-up. This results in lower pulsating torque produced by the motor, which, in turn, benefits the motor's mechanical driveline. Finally, PWM AC voltage regulators offer the possibility for power factor correction.

Practical implementation of three-phase PWM AC voltage regulators requires semiconductor switches that can conduct, or block, electric current flow in either direction in a fully controllable manner. Such switches are also referred to as four-quadrant switches. No such single semiconductor device is available commercially nowadays. Therefore, four-quadrant switches are implemented as a combination of two two-quadrant switches (i.e. switches that can fully control the current flow in one direction only). Examples of two-quadrant semiconductor switches are bipolar junction transistors (BJTs), gate turn-off thyristors (GTOs), field-effect transistors (FETs) and previously mentioned IGBTs. When both two-quadrant switches in a four-quadrant switch are turned on, the four-quadrant switch conducts electric current in either direction. When both two-quadrant switches are turned off, the four-quadrant switch blocks electric current from either direction. When only one of the two two-quadrant switches is turned on, the four-quadrant switch conducts current only in the direction allowed by the two-quadrant switch that is turned on.

Control of a three-phase PWM AC voltage regulator may be accomplished in different ways. Two possible methods are described in A. Mozdzer and B. K. Bose, "Three-Phase AC Power Control Using Power Transistors," *IEEE Transactions on Industry Applications,* Vol. IA–12, No. 5, September/October 1976, pp. 499–505 and in S.A.K. Bhat, "Digitally-controlled multiple-pulse-width-modulated AC chopper for power control," *International Journal of Electronics,* Vol. 51, No. 1, 1981, pp. 45–56. Both control methods are developed for four-quadrant switches implemented with BJTs. They are both dependent on the load power factor, which makes them unsuitable for starting of induction motors (during the start-up, the power factor of a typical induction motor changes from a low value to a high value). In addition, under certain operating conditions, the described methods result in distorted output voltage and current waveforms. There is therefore a need for a control method for three-phase PWM AC voltage regulators suitable for starting induction motors with good voltage and current waveforms. One typical AC-to-AC converter topology that requires four-quadrant switches is a matrix converter. In a matrix converter, each phase of a polyphase input is connected, via a four-quadrant switch, to each phase of a polyphase output. A control method for four-quadrant switches, as applied to matrix converters, is described in N. Burany, "Safe Control of Four Quadrant Switches," 1989 *IEEE IAS Annual Meeting,* pp 1190–1194. As detailed in this reference, the commutation of a load current in a matrix converter always occurs between two four-quadrant switches connected to the same load terminal. Each of these four-quadrant switches connects the load current to an input voltage source. The commutation is carried out in four consecutive steps where each step includes turning on, or off, one of the four available two-quadrant switches. The two-quadrant switches to be turned on (or off) are chosen, as is the sequence in which the switches are turned on and off, in such a way that the input voltage sources are never shorted (shorting them would cause a potentially destructive over-current) and the inductive load current is never interrupted (interrupting it would cause a potentially destructive over-voltage). The time interval between any two consecutive steps is long enough to allow for the two-quadrant switches to turn completely on (or off). Due to the matrix converter topology, the commutation of any one of the three load currents is independent from the other two. Thus, the commutation sequence, as explained in the above-referenced paper, is valid for both single- and polyphase matrix converters.

The topology of a three-phase PWM AC voltage regulator differs from that of a matrix converter. Specifically, commutation of any one of the three load currents is not independent from the other two. Consequently, the commutation method described above is not acceptable for applications of this type.

SUMMARY OF THE INVENTION

The present invention provides a system and method for implementing and controlling a set of four-quadrant switches in a PWM AC voltage regulator. This system and method does not result in a distortion of output current and voltage waveforms, and is independent of the load power factor. In addition, by providing a commutation method for four-quadrant switches, it is possible to provide a system to control a PWM AC voltage regulator without short-circuiting input voltage sources or interrupting load currents. The present invention provides a control method for commutating the load currents among different converter switches at specific time instances without causing short-circuit of the converter input voltage sources or interruptions of the inductive load currents.

To attain the advantages and in accordance with the purposes of the invention, as embodied and broadly described herein, there is provided a method for implementing and controlling a three-phase pulse-width-modulated alternating current voltage regulator to convert a commercial three-phase input to a variable three-phase output to be supplied to a load, wherein the regulator includes six four-quadrant switches, each four-quadrant switch comprising two two-quadrant switches. Three series branches, each series branch including one four-quadrant switch, and three shunt branches, each shunt branch including one four-quadrant switch, are provided. The polarity of a current being applied to the load is sensed. To obtain a desired converter state, the two quadrant switches in the series and shunt branches are turned on or off in a predetermined sequence based on the sensed polarity of the current being applied to the load. Further, there is provided a three-phase, PWM AC voltage regulator system for converting a commercial three-phase input to a variable three-phase output to be supplied to a load, wherein the system includes a three phase voltage source, a converter circuit, a three phase load, load current sensors, a system for sensing the polarity of a current being applied to the load, and a processor. The converter circuit comprises six four-quadrant switches, each four-quadrant switch being implemented by two two-quadrant switches. The processor is configured to obtain current polarity information and to turn the switches on and off in a predetermined manner to obtain the desired voltage based on the sensed polarity of the current being applied to the load.

Additional objects and advantages of the invention will be set forth in part in the description which follows, and in part will be appreciated by one of ordinary skill from the description, or may be learned by practice of the invention. The objects and advantages of the invention will be realized and attained by means of the elements and combinations particularly pointed out in this application and the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DESCRIPTION OF THE PREFERRED EMBODIMENTS

Reference will now be made in detail to the presently preferred embodiment of the present invention, an example of which is illustrated in the accompanying drawings. Wherever possible, the same reference numbers will be used throughout the drawings to refer to the same or like parts. An exemplary embodiment of a system of the present invention is shown in FIG. 1 and is designated generally by reference number 100.

In accordance with the present invention, there is provided a system and method for implementing a set of four-quadrant switches in a three-phase PWM AC voltage regulator such as the voltage regulator described in U.S. patent application Ser. No. 09/963,642 entitled "Space Vector Modulation-Based Control Method and Apparatus for Three-Phase Pulse Width Modulated AC Voltage Regulators" to Jadric, which is herein incorporated by reference. In particular, the invention provides a control system and method for providing four-quadrant switches, using pairs of two-quadrant switches. As a result, the present invention can be used to supply a variable output voltage to a three-phase AC load, such as a motor. More particularly, the present invention can be used to supply a variable output voltage to a three-phase induction motor such as those used in the heating, ventilation, and air-conditioning (HVAC) industry.

Figure 1:
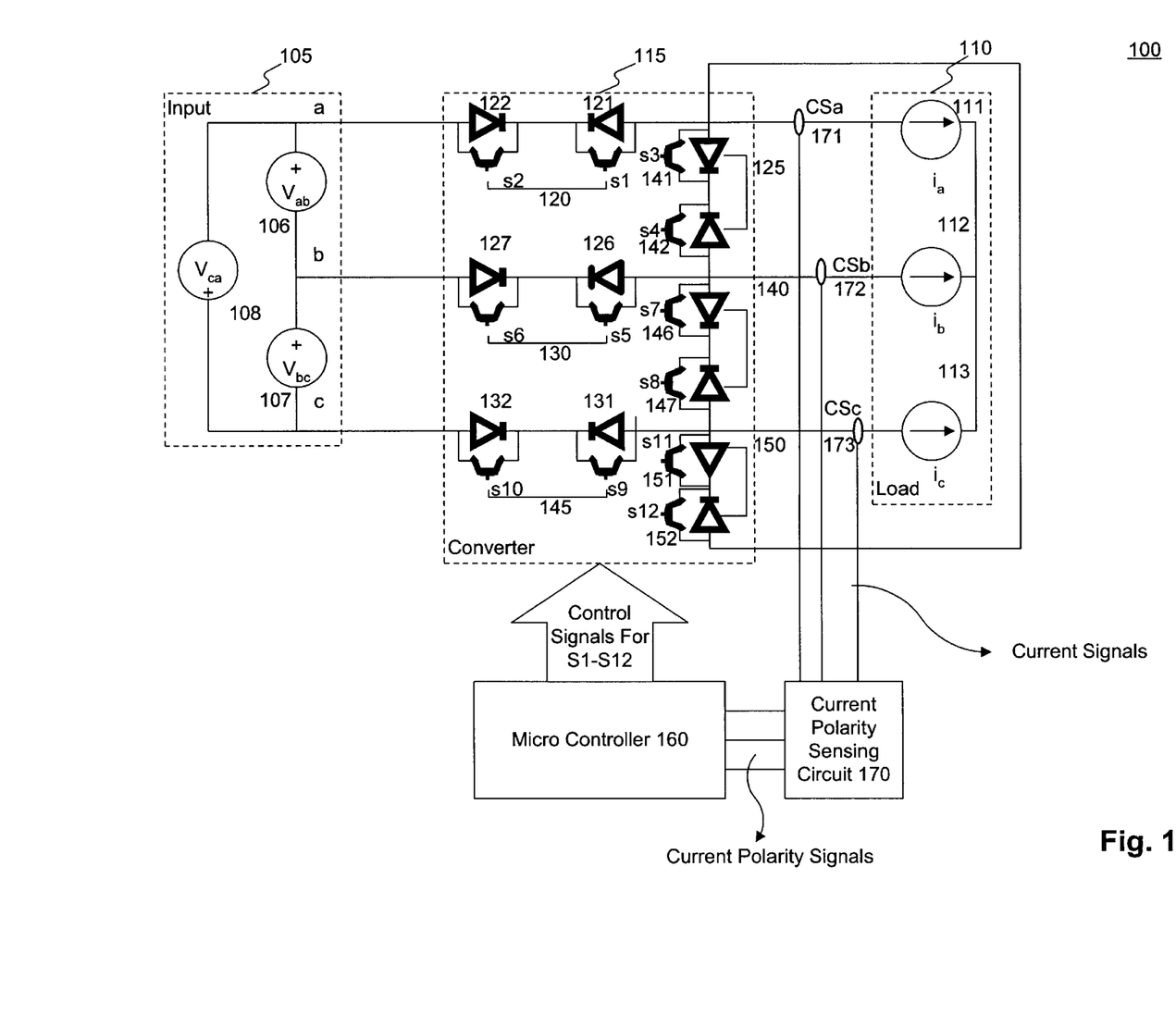
FIG. 1 is a schematic diagram of an exemplary three-phase PWM AC voltage regulator.

By way of a non-limiting example, FIG. 1 illustrates an exemplary three-phase PWM AC voltage regulator 100 that utilizes six four-quadrant switches (120, 125, 130, 140, 145, and 150). The PWM AC voltage regulator 100 includes an input circuit 105, an output load circuit 110, and a converter circuit 115, connecting the input circuit 105 to the output load circuit 110. The PWM AC voltage regulator 100 supplies variable-magnitude output voltage to the AC load circuit by varying the duration of the voltage pulses generated by the converter 115, the pulses resulting in an output voltage waveform. The input circuit 105 may be represented by an ideal three-phase voltage source, including voltage sources 106–108, which may be formed via a commercially available line source at a line frequency of typically 50 or 60 Hz. The AC load circuit 110 is typically inductive, and may be simplistically represented by an ideal three-phase current source, including current sources 111–113. PWM AC voltage regulator 100 also includes a processor 160 (such as a microcontroller), output current sensors 171–173, and a current polarity sensing circuit 170.

The converter circuit 115 includes six four-quadrant switches 120, 125, 130, 140, 145, and 150. In the preferred embodiment, each of the four-quadrant switches, for example four-quadrant switch 120, consists of a pair of two-quadrant switches, in this cases s1 121 and s2 122. The two-quadrant switches, for example s1 121 and s2 122, may be thought of as IGBTs (shown in FIG. 1 with their anti-parallel diodes), but other types of two-quadrant switches, could also be used. Three of the four-quadrant switches 120, 130, and 145 are considered series switches and are found on series branches interconnecting the line voltage with the output. The remaining four-quadrant switches, namely 125, 140, and 150, are considered shunt switches and are found on shunt branches, interconnecting the load terminals.

Particularly, the series switches connect the input circuit 105 with the load circuit 110. Series switch 120 is connected, in series, between input node a and current source 111 of load circuit 110. Similarly, series switch 130 is connected, in series, between input node b and current source 112 of load circuit 110. Series switch 145 is connected, in series, between input node c and current source 113 of load circuit 110.

The shunt switches 125, 140 and 150 connect the series switches 120, 130, and 145, and are located at the terminal end of each series switch nearest to load circuit 110. Specifically, shunt switch 125 is connected between the terminal ends of series switches 120 and 130; shunt switch 140 is connected between the terminal ends of series switches 130 and 145; shunt switch 150 is connected between the terminal ends of series switches 145 and 120.

The converter may operate as follows. When all the switches in the series branches (namely s1 121, s2 122, s5 126, s6 127, s9 131, and s10 132) are turned on, and all the switches in the shunt branches (namely, s3 141, s4 142, s7 146, s8 147, s11 151, and s12 152) are turned off, the input of the converter is connected directly to the output of the converter. This state is labeled converter ON state. During the converter ON state, electric power is exchanged between the converter input and output and the load 110 runs with a direct connection to the input 105. Conversely, when all the switches in the series branches are turned off, and all the switches in the shunt branches are turned on, the load terminals are short-circuited, the converter input is disconnected from the converter output, and no power flows between the two. This state is labeled converter OFF state.

Preferably, switches s1–s12 are controlled by processor 160, which may be implemented by a micro controller. The processor, however, can be any type of processor capable of processing input signals and providing output signals to control the switches in a predetermined manner. Processor 160 includes information (such as software and inputs) regarding sequences for turning various switches on and off based on load current conditions of the System 100. (This information is described in greater detail with reference to FIGS. 3A to 4B.)

The load current conditions of system 100 are determined by current polarity sensing circuit 170. The load currents may be sensed by three current sensors $CS_a$–$CS_c$ 171–173. (Alternatively, two current sensors may be used. The third current could then be calculated, since the sum of the three currents should always equal zero.) The current sensors 171–173 provide current signals, which typically have the same waveform as their respective currents, but are scaled down in magnitude.

The current signals are then provided to the current polarity sensing circuit 170. This circuit detects the polarity of the current signals. For example, if a current signal is positive, circuit 170 will output a logic high value relative to that current; conversely, if a current signal is negative, circuit 170 will output a logic low value. Sensing circuit 170 can take a variety of forms, as is known in the art.

These polarity values are then sent to processor 160. Thus, at any instant of time, processor 160 has information (in the form of logic highs and/or logic lows) about the polarity of the load currents. Based on this polarity information and the sequence information stored within processor 160, the processor 160 can send control signals to switches s1 to s12 to obtain the desired output voltage waveform. The information in processor 160, for example, may take the form of computer software developed to provide to a load a voltage waveform that slowly provides a ramping start-up voltage to the induction motor load during start-up and then provides a running voltage after startup. Depending on the application of the invention, the processor may receive additional control inputs, so that the inductive load, such as a motor, is driven to meet the needs of the system in which it is incorporated.

Figure 2:
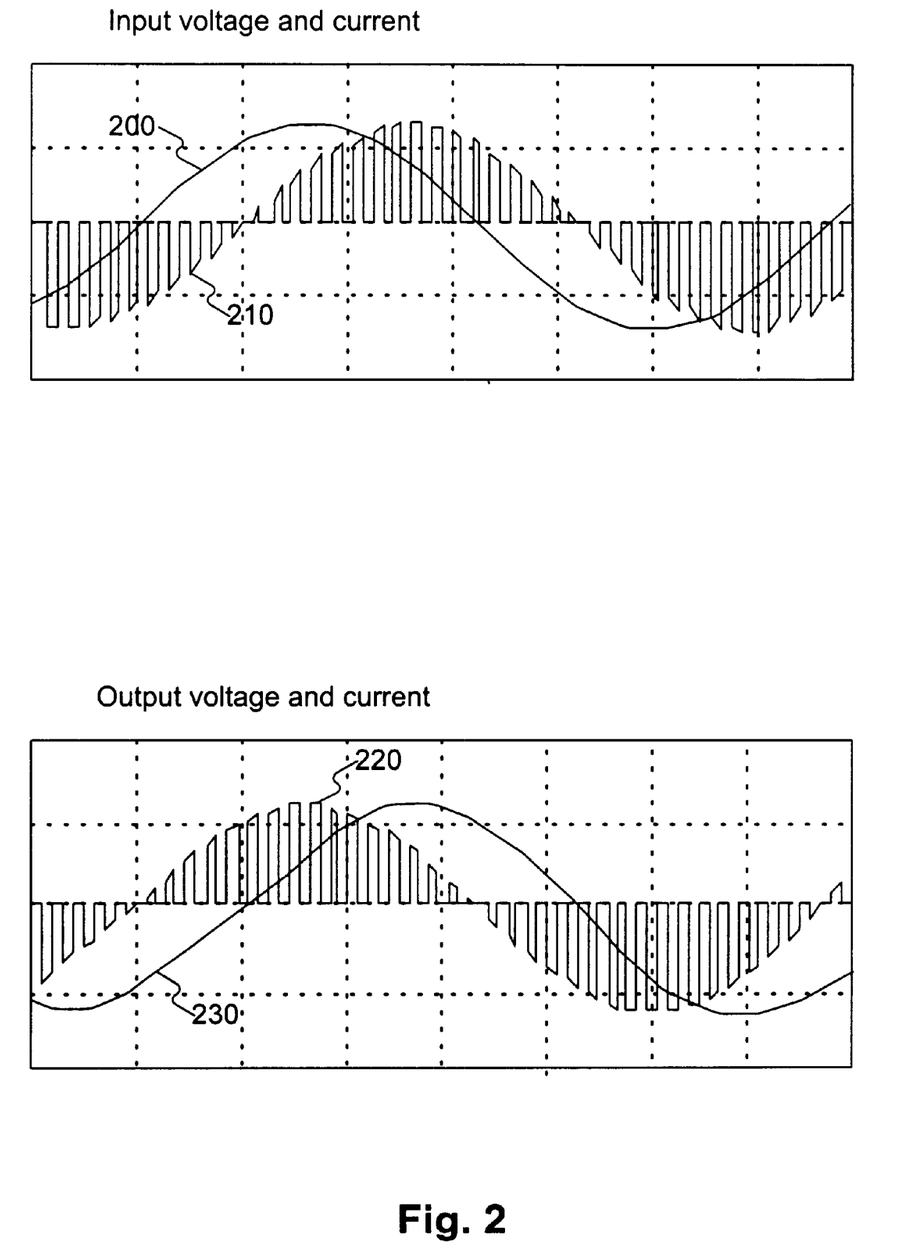
FIG. 2 is an exemplary diagram of a relationship between the input voltage and the output voltage and current consistent with the present invention.

Referring now to FIG. 2, if the converter ON and OFF states (in system 100) follow each other in time at a switching frequency much higher than the line frequency, the input 200 and output 220 voltage waveforms for one converter phase are obtained. The input voltage 200 is a pure sinusoid. The output voltage 220 is a series of high-frequency pulses, having the input voltage sinusoid as their envelope. It may be understood that each pulse in the output voltage waveform corresponds to an interval of time during which the converter is in ON state. Similarly, each gap in the output voltage waveform corresponds to an interval of time during which the converter is in OFF state. By varying the ratio of the duration of these two intervals (or by varying the width of each pulse while keeping the switching frequency constant), the value of the fundamental (line-frequency) component of the output voltage waveform may be varied.

The system may be used, for example to ramp up voltage slowly and to avoid a high inrush current when starting an induction motor. For example, in an industrial air-conditioning application, the voltage applied to the induction motor may be ramped up over 40 seconds by starting with pulses of very narrow width and then increasing the width of the pulses until the converter is continuously in the ON state, i.e. full line voltage is continuously supplied to the load.

The current waveforms (input 210 and output 230) are dual to the voltage waveforms. The output (load) current 230 is a pure sinusoid. (The output current in FIG. 2 shows a small amount of switching frequency ripple because it was obtained from a simulation in which the load was inductive, rather than an ideal current source.) The input (i.e. series branch) current 210 consists of a series of high-frequency pulses, having the output current waveform as their envelope. Each gap in the input current waveform corresponds to a converter OFF state, during which the load current is freewheeled through the converter shunt branches.

The operation of the converter relies on the capability to detour the three-phase load currents from the converter series branches (converter ON state) to the converter shunt branches (converter OFF state), and vice versa. Due to finite turn-on and turn-off times of semiconductor switches, this detour cannot occur instantaneously. Rather, it must be carried out in a controlled manner, so that the input voltage sources are never shorted and the output load current is never interrupted. Unlike in a matrix converter, where current commutation can be studied by isolating one phase from the rest of the converter, the current commutation in a three-phase AC voltage regulator needs to be addressed for the converter as a whole. This is due to the fact that the shunt branches of the converter are shared by two of the converter's phases, and it is not possible to say that a certain branch takes part in the commutation of only one of the load currents.

A three-phase sinusoidal output current waveform corresponding to a balanced load during one line cycle can be divided in six intervals. During each one of these intervals, the currents of two of the output phases are of one polarity, and the third current is of the opposite polarity. In order to short the output currents (make the converter operate in OFF state), not all of the switches in the shunt branches need to be turned on. Only those two shunt branches involving the phase that has the load current polarity different from the other two need to be shorted. These shunt branches will be referred to as the active shunt branches. The third, remaining shunt branch is not an active shunt branch for this particular polarity of load currents, and the switches in it can be kept turned off for as long as a particular current polarity exists. For example, if the output currents ia and ic are positive (positive being defined as in the direction of arrows on the current source symbols in FIG. 1) and $i_b$ is negative, then s3 141, s4 142, s7 146, and s8 147 need to be turned on in order to short the output currents. Switches s11 151 and s12 152 can be left open for as long as this particular current polarity exists.

Further, in any converter branch (series or shunt), for a given load current polarity, a redundant switch is defined as any switch whose anti-parallel diode allows this particular current polarity. Analogously, a necessary switch is any switch whose anti-parallel diode blocks this particular current polarity.

Figure 3A:
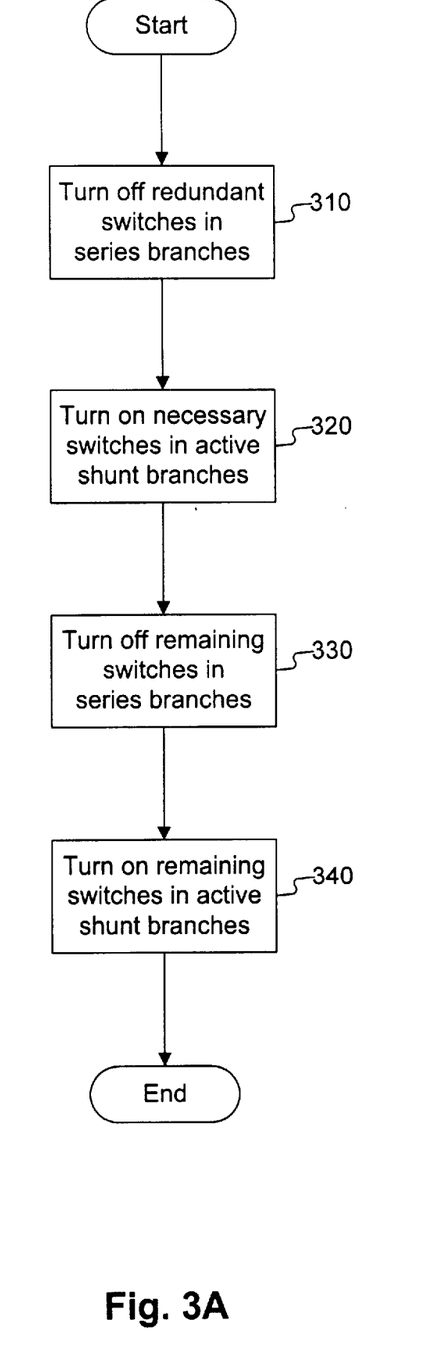
FIG. 3A is a flow chart illustrating exemplary steps for commutating from the converter ON state to the converter OFF state.
Figure 4A:
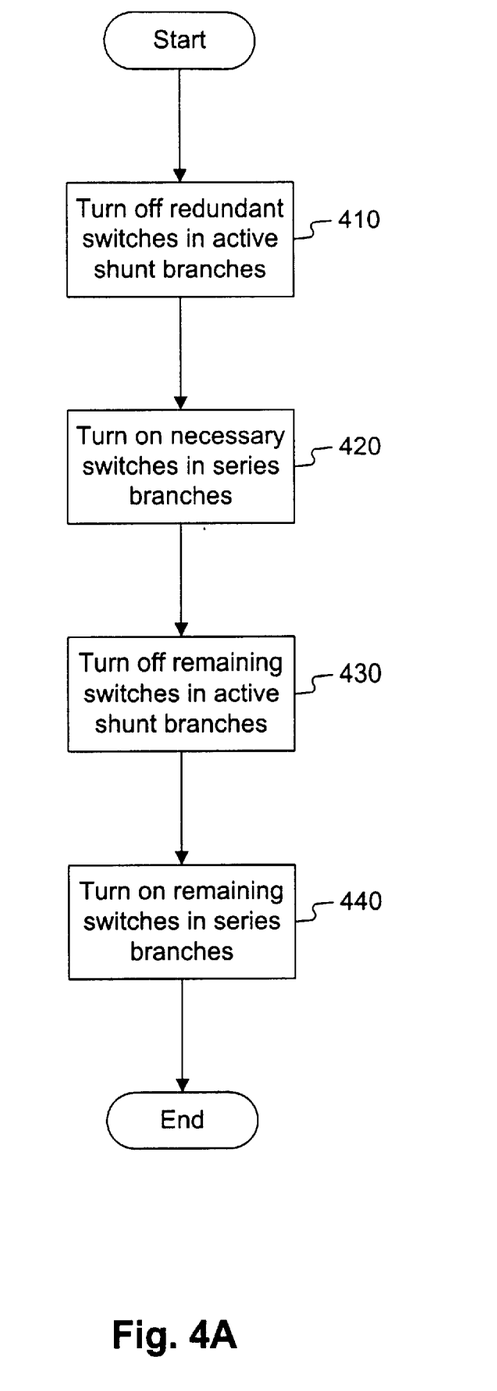
FIG. 4A is a flow chart illustrating exemplary steps for commutating from the converter OFF state to the converter ON state.

Once the polarities of the load currents are known, the commutation of the load currents from series to shunt branches, and vice versa, can be accomplished in four steps, as shown in FIGS. 3A and 4A.

FIG. 3A illustrates the steps required to transition from the converter ON state to the converter OFF state, consistent with the present invention. First, redundant switches in the series branches are turned off (step 310). Turning off these switches does not affect the currents in the system, because the currents can still flow through the redundant switches' anti-parallel diodes; at the same time, it eliminates the possibility of short-circuiting the input voltages in one of the following steps. Next, the necessary switches in the active shunt branches are turned on (step 320). Turning on these switches assures path availability in shunt branches for the output (load) currents. Third, the remaining switches in the series branches are turned off (step 330). Finally, the remaining switches in the active shunt branches are turned on (step 340). The switches in non-active shunt branch are kept turned off during the entire process described above. This completes the load current commutation process from series to shunt branches, i.e. one converter transition from ON to OFF state. Once the converter 115 is in OFF state, it will be necessary to transition to the ON state again. The processor 160 follows the steps of FIG. 4A (described below) in order to accomplish this.

Figure 3B:
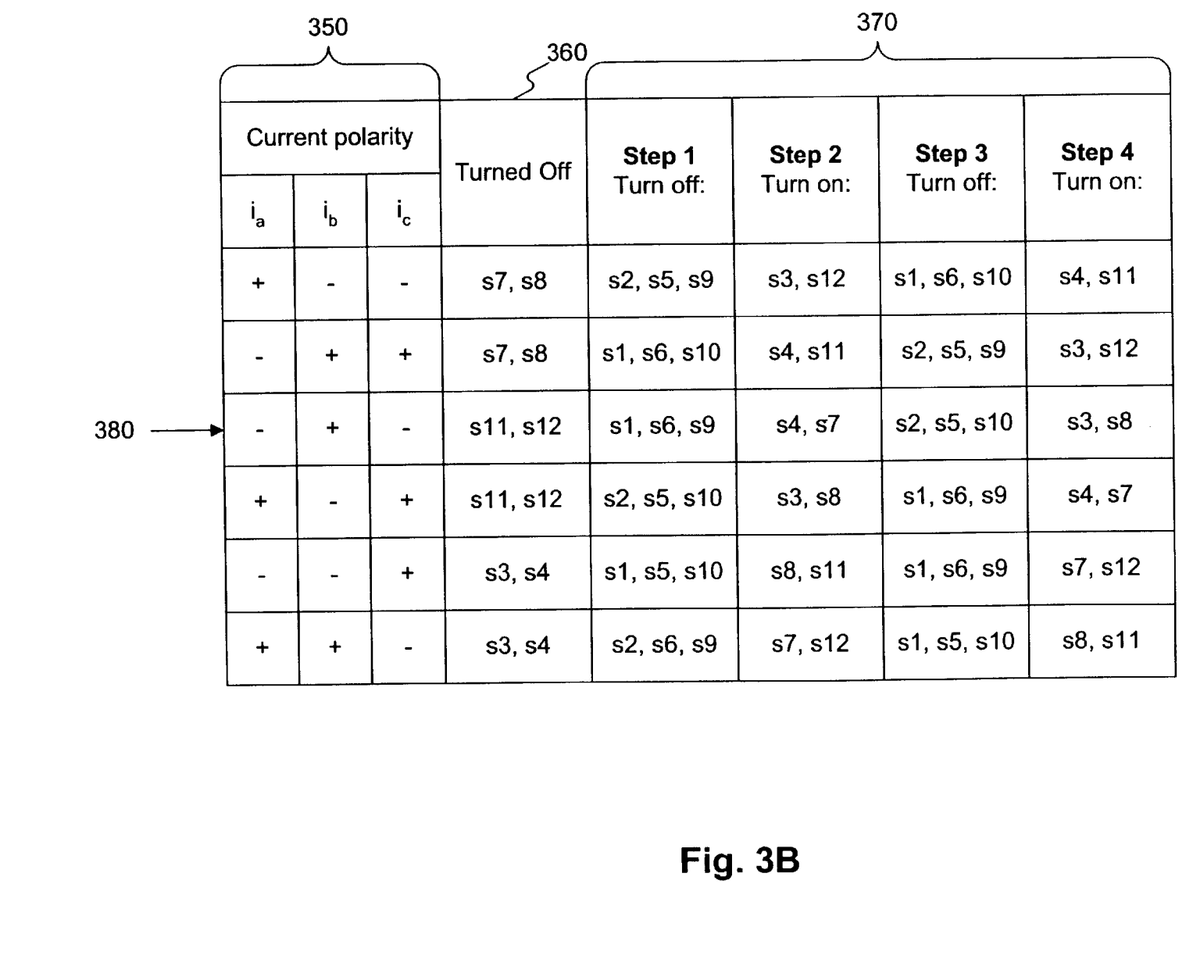
FIG. 3B is a table detailing the actions for commutating from the converter ON state to the converter OFF state.

FIG. 3B illustrates the steps of FIG. 3A with more specificity. All the possible polarities of load currents $i_a$, $i_b$, and $i_c$ are shown in the first three columns 350. The switches that are kept turned off as long as a particular current polarity exists are shown in the fourth column 360 (they correspond to the shunt branches that are not active shunt branches for a given load current polarity). The final four columns 370 illustrate which switches are turned off and on in which steps (steps 310–340 of FIG. 3A) for a particular load current polarity. For example, consider the row of FIG. 3B, labeled 380. Based on the entries for row 380 in columns 350, $i_b$ has a positive value while $i_a$ and $i_c$ have a negative value. In the fourth column 360, it is shown that switches s11 151 and s12 152 are kept permanently off in this case. The first step is to turn off the redundant switches in the series branches (step 310). Using the step 1 column in FIG. 3B, it is determined that switches s1 121, s6 127, and s9 131 should be turned off. Similarly, continuing across the row, the necessary switches in the active shunt branches that must be turned on include s4 142 and s7 146. Next, the remaining series switches s2 122, s5 126 and s10 132 are turned off, after which the remaining shunt switches s3 141 and s8 147 are turned on. The information in FIG. 3B is stored by processor 160.

Figure 4B:
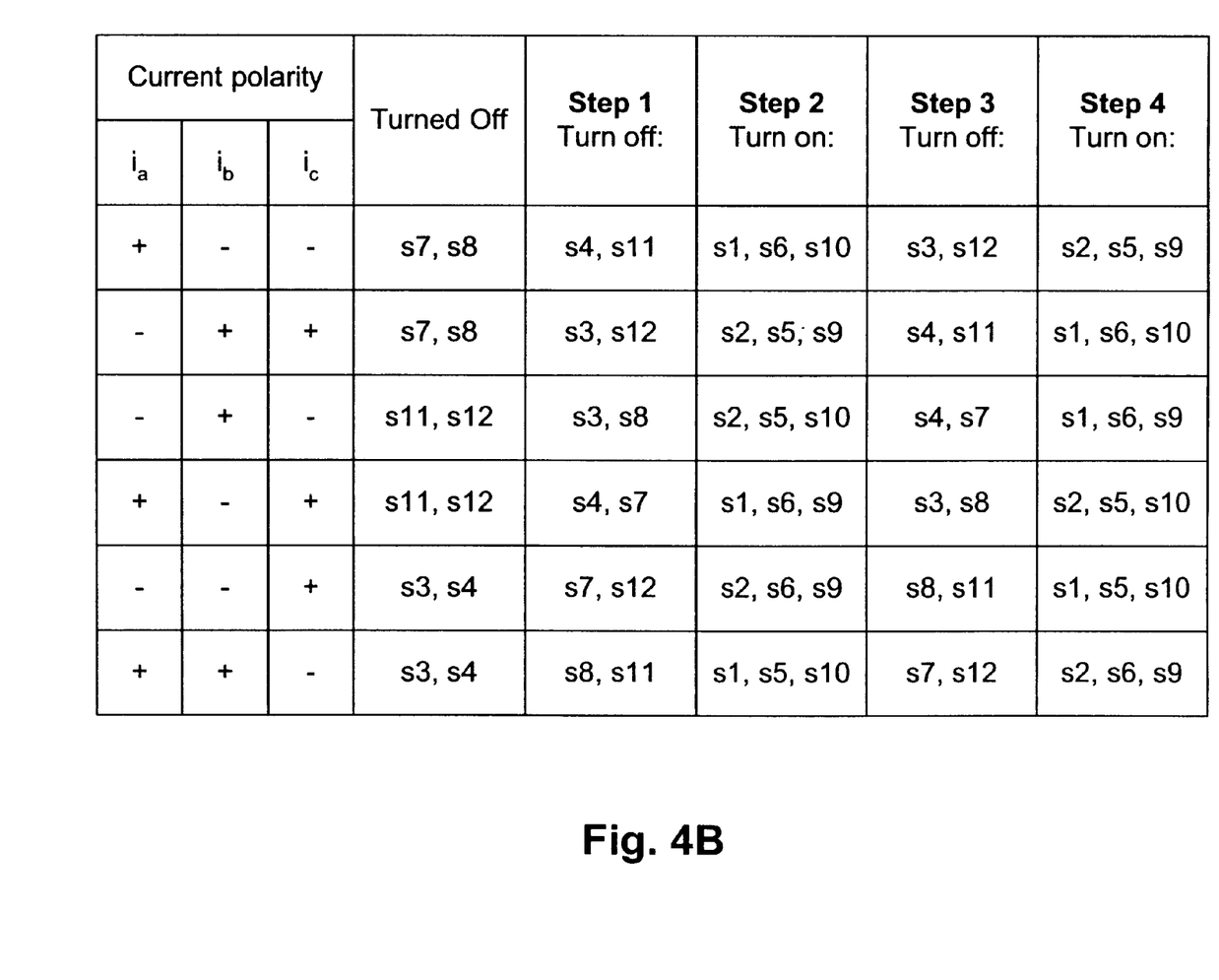
FIG. 4B is a table detailing the actions for commutating from the converter OFF state to the converter ON state.

Similar to FIG. 3A, FIG. 4A illustrates the steps to transition from the converter OFF state to the converter ON state, consistent with the present invention. First, redundant switches in active shunt branches are turned off (step 410). Next, the necessary switches in the series branches are turned on (step 420). The remaining switches in the active shunt branches are then turned off (step 430). Finally, the remaining switches in the series branches are turned on (step 440). The switches in non-active shunt branch are kept turned off while the above steps are executed. FIG. 4B, similar to FIG. 3B, provides specific switch information for following the steps 410 to 440 of FIG. 4A, depending on the polarities of load currents $i_a$, $i_b$, and $i_c$. (The information of FIG. 4B is also stored by processor 160.)

In between any two consecutive steps, enough time must elapse for the two-quadrant switches to turn completely on, or off. This period of time may be approximately one-half microsecond if two-quadrant switches are IGBTs. Whether transitioning from converter ON to converter OFF state, or vice versa, the first steps (steps 310 and 410) assure that the input voltage sources are not shorted. The second steps (steps 320 and 420) assure that there is a path available for the output load current to flow. The actual commutation of the output currents occurs either at the second or third steps (320–330 or 420–430), depending on the polarity of the input voltages.

The control and commutation method for three-phase PWM AC voltage regulators described above and illustrated in FIGS. 3A–4B relies only on the information on load current polarities; it does not depend on the polarities of line voltages. This makes it independent from load power factor, and thus particularly suitable for controlling power to loads with variable power factor, e.g. induction motors during start-up.

It will be apparent to those skilled in the art that various modifications and variations can be made in the device of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for implementing a three-phase pulse-width-modulated alternating current voltage regulator to convert a commercial three-phase input to a variable three-phase output to be supplied to a load, the regulator including six four-quadrant switches, wherein each four-quadrant switch includes two two-quadrant switches, said method comprising:

providing three series branches, each series branch including one four-quadrant switch;

providing three shunt branches, each shunt branch including one four-quadrant switch;

sensing the polarity of a current being applied to the load; and turning on or off a plurality of the two-quadrant switches in the series and shunt branches in a predetermined sequence based on the sensed polarity of the current being applied to the load.

2. The method of claim 1, wherein the two-quadrant switches are turned on or off by a processor.

3. The method of claim 2, wherein the processor controls the switching in a manner that provides a pulse-width modulated AC voltage to the load, without short-circuiting input voltage sources and without interrupting load currents.

4. The method of claim 3, wherein the processor controls the switching of the series and shunt branches to provide a variable pulse-width modulated AC voltage to the load such that the voltage increases to a pre-selected maximum, at which time the input voltage is directly applied to the load.

5. The method of claim 1, further comprising the step of:

determining whether the regulator is in an ON or OFF state.

6. The method of claim 5, wherein when the regulator is in an ON state, the steps of turning on or off a plurality of the two quadrant switches includes the steps of:

determining active and inactive branches in the shunt branches;

maintaining, in an off state, any switches in the inactive shunt branches;

determining redundant switches in the series branches;

determining necessary switches in the active shunt branches;

turning off the determined redundant switches in the series branches;

turning on the determined necessary switches in the active shunt branches;

turning off any switches in the series branches that are on; and turning on any switches in the active shunt branches that are off.

7. The method of claim 5, wherein when the regulator is in an OFF state, the steps of turning on or off a plurality of the two quadrant switches includes the steps of:

determining active and inactive branches in the shunt branches;

maintaining, in an off state, any switches in the inactive shunt branches;

determining redundant switches in the active shunt branches;

determining necessary switches in the series branches;

turning off the determined redundant switches in the active shunt branches;

turning on the determined necessary switches in the series branches;

turning off any switches in the active shunt branches that are on; and turning on any switches in the series branches that are off.

8. A system for implementing a three-phase pulse-width-modulated alternating current voltage regulator to convert a commercial three-phase input, having first, second, and third terminals, to a variable three-phase output to be supplied to a load, the system comprising:

six four-quadrant switches, wherein each four-quadrant switch includes two two-quadrant switches;

said six four-quadrant switches providing a converter circuit, connected at a first end to the first, second, and third terminals of the three-phase input;

a three-phase load having a first, second, and third terminals, wherein a second end of the converter circuit is connected to the first, second, and third terminals of the three-phase load;

a system for sensing the polarity of the currents being applied to the load; and a processor for controlling the converter circuit, based on information from the load current polarity sensing circuit.

9. The system of claim 8, wherein the converter circuit comprises;

a first four-quadrant switch, having a first and second ends, wherein the first end of the first switch is connected to the first terminal of the three-phase voltage source;

a second four-quadrant switch, having a first and second ends, wherein the first end of the second switch is connected to the second terminal of the three-phase voltage source;

a third four-quadrant switch, having a first and second ends, wherein the first end of the third switch is connected to the third terminal of the three-phase voltage source;

a fourth four-quadrant switch, having a first and second ends, wherein the first end of the fourth switch is connected to the second end of the first switch and the second end of the fourth switch is connected to the second end of the second switch;

a fifth four-quadrant switch, having a first and second ends, wherein the first end of the fifth switch is connected to the second ends of the fourth and second switch and the second end of the fifth switch is connected to the second end of the third switch; and a sixth four-quadrant switch, having a first and second ends, wherein the first end of the sixth switch is connected to the second ends of the fifth and third switch and the second end of the sixth switch is connected to the second end of the first switch and the first end of the fourth switch;

wherein the first terminal of the three-phase load is connected to the second ends of the first and sixth switches and the first end of the fourth switch, the second terminal of the three-phase load is connected to the second ends of the second and fourth switches and the first end of the fifth switch, and the third terminal of the three-phase load is connected to the second ends of the third and fifth switches and the first end of the sixth switch.

10. The system of claim 8, wherein the processor includes instructions for turning the first through sixth switches on and off in a predetermined sequence based on the sensed polarities of a current applied to the load.

11. The system of claim 8, wherein the current polarity sensing system includes:

a first load current sensor;

a second load current sensor; and a third load current sensor.

\* \* \* \* \*

UNITED STATES PATENT AND TRADEMARK OFFICE
CERTIFICATE OF CORRECTION

PATENT NO. : 6,459,606 B1
DATED : October 1, 2002
INVENTOR(S) : Ivan Jadrić

It is certified that error appears in the above-identified patent and that said Letters Patent is hereby corrected as shown below:

Column 8,
Line 23, "ia and ic" should read -- $i_a$ and $i_c$ --.

Signed and Sealed this

Thirty-first Day of August, 2004

JON W. DUDAS
*Director of the United States Patent and Trademark Office*